United States Patent [19]
Suzuki et al.

[11] Patent Number: 5,828,780
[45] Date of Patent: *Oct. 27, 1998

[54] IMAGE PROCESSING APPARATUS WITH IMPROVED COLOR CORRECTION

[75] Inventors: Hiroaki Suzuki, Ichikawa; Shougo Ooneda, Urayasu, both of Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 359,145

[22] Filed: Dec. 19, 1994

[30] Foreign Application Priority Data

Dec. 21, 1993 [JP] Japan .................................. 5-322873
Feb. 2, 1994 [JP] Japan .................................. 6-030876

[51] Int. Cl.⁶ .................................................. G06K 9/46
[52] U.S. Cl. ..................................... 382/167; 358/518
[58] Field of Search ................................. 382/162, 164, 382/167; 358/518, 520, 522

[56] References Cited

U.S. PATENT DOCUMENTS

| | | | |
|---|---|---|---|
| 4,989,080 | 1/1991 | Ito | 358/520 |
| 5,109,275 | 4/1992 | Naka et al. | 358/518 |
| 5,187,570 | 2/1993 | Hibi et al. | 358/520 |
| 5,239,370 | 8/1993 | Yamaguchi | 358/518 |
| 5,285,297 | 2/1994 | Rose et al. | 358/520 |
| 5,307,182 | 4/1994 | Maltz | 358/522 |
| 5,323,249 | 6/1994 | Liang | 358/520 |
| 5,363,318 | 11/1994 | McCauley | 358/519 |
| 5,450,502 | 9/1995 | Eschbach et al. | 382/169 |
| 5,463,480 | 10/1995 | MacDonald et al. | 358/518 |
| 5,539,540 | 7/1996 | Spaulding et al. | 358/501 |
| 5,541,742 | 7/1996 | Imao et al. | 358/520 |

*Primary Examiner*—Yon J. Couso
*Attorney, Agent, or Firm*—McDermott, Will & Emery

[57] ABSTRACT

The present invention provides a color image processing apparatus comprises a virtual device for executing processing in a reverse direction to that in the color image output device in which output color image data in the color image output device corresponds to input color image data and input color image data therein corresponds to output color image data, and a discriminating unit for making a determination as to whether input color image data is within a color reproduction range of the color image output device according to output color image data from the virtual device.

26 Claims, 18 Drawing Sheets

F I G. 1 4
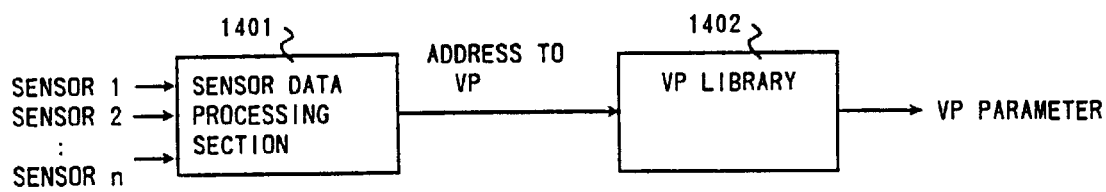
F I G. 1 5
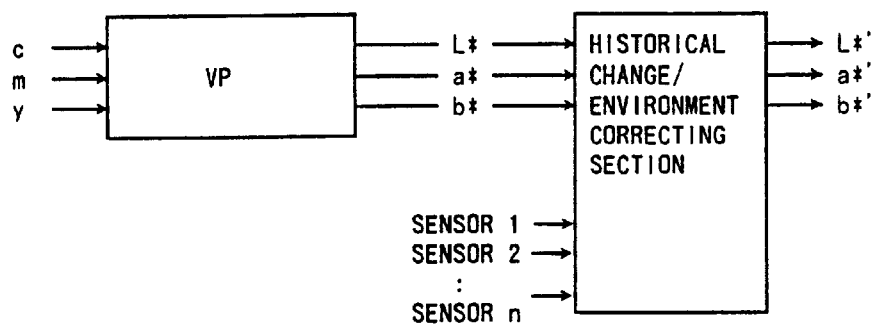

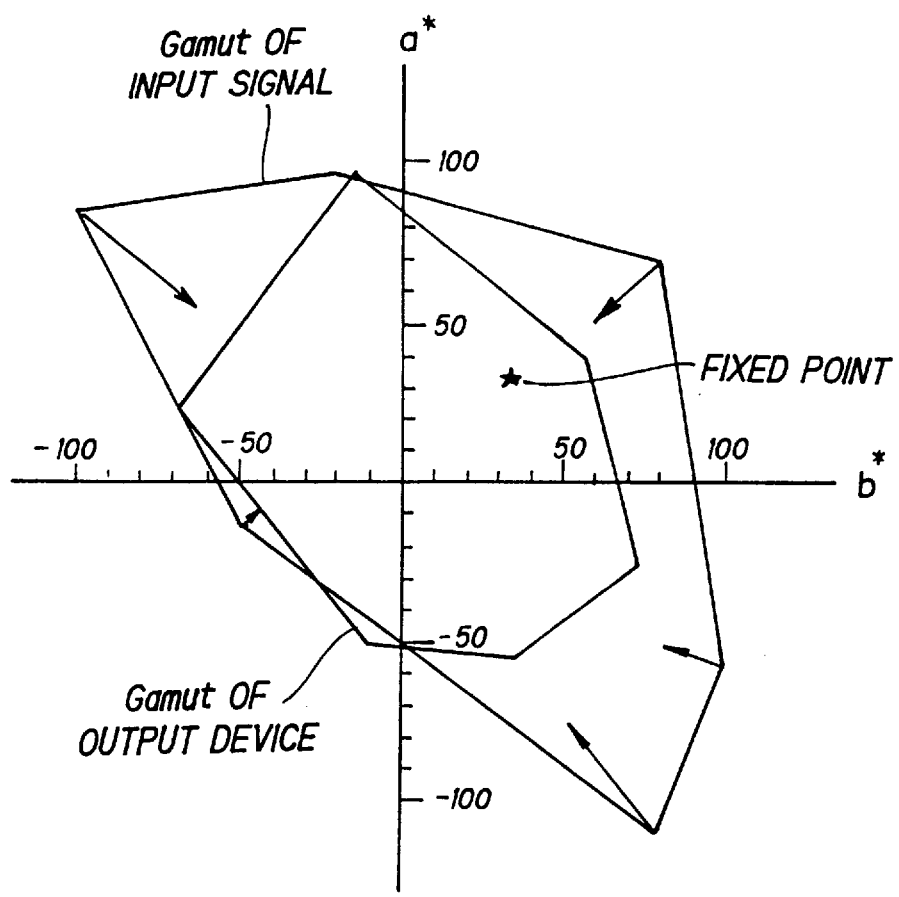
F I G. 1 7

F I G. 1 8
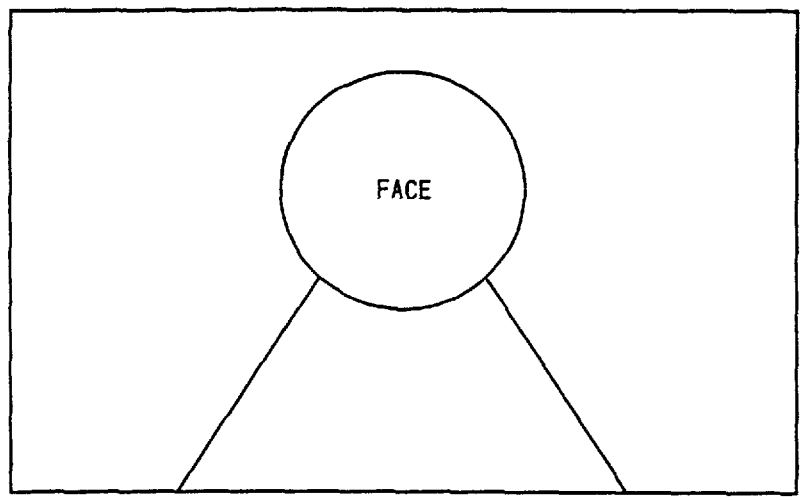
F I G. 1 9
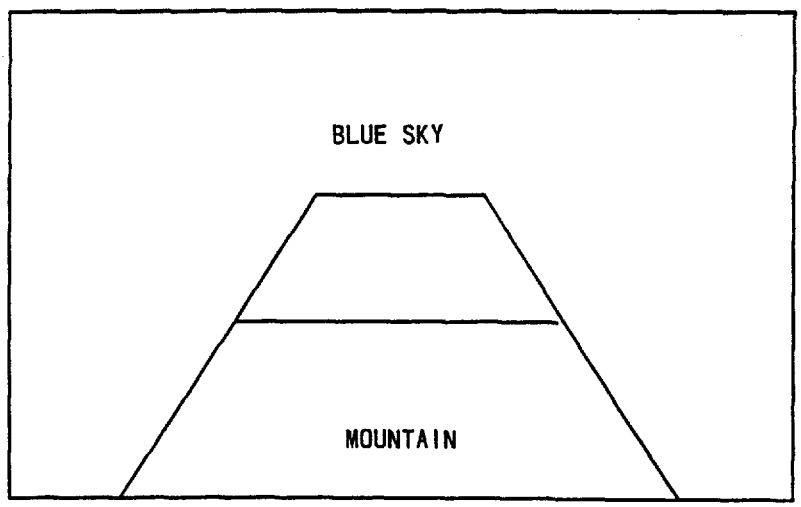

IMAGE PROCESSING APPARATUS WITH IMPROVED COLOR CORRECTION

FIELD OF THE INVENTION

The present invention relates to an image processing apparatus which executes a color correction processing for correcting inputted color image data to color image data within a range of color reproduction in a color image output device or a color correction processing for correcting input image data using parameters.

BACKGROUND OF THE INVENTION

In a conventional type of image processing apparatus which executes a color correction processing for correcting color image data inputted from a color image input device such as a scanner or a computer within a range of color reproduction in a color image output device such as a printer, or a display unit, when color image data is inputted at a position outside the range of color reproduction in the color image output device, a method detecting a position within a space of the color reproduction range closest to a position of the color image data and outputting a result of detection, or a method of reducing a size of the inputted color image data toward the center of gravity of the space of the color reproduction range described above and outputting the minimized color image data has been used.

Also in this case, data modeling a color reproduction range of a color image output device (the model is based on a division of a three-dimensional space for color reproduction) is prepared, and determination as to a color reproduction image is made by comparing this model to the inputted color image data.

On the other hand, for compression and color correction, an corrected image is practically outputted by a color image output device, then a user makes a determination as to whether the outputted color image can be accepted or not, and if necessary, the user again corrects the color image.

Also in the conventional technology, once parameters for correction are decided taking into consideration the characteristics of an output device, image processing is executed using the same parameters for any image. Generally the parameters are decided so that an average of squared errors for all colors will be minimized, but the colors include those having a small error or those having a large error, and sometimes the colors having a large error may be important for a pattern of the image. For this reason, in an output device frequently used for outputting human images, sometimes parameters are decided putting a priority in for skin color.

However, with the conventional technology as described above, a determination is made by comparing data modeling a color reproduction range in a color image output device to inputted color image data, so that it is necessary to appropriately prepare data modeling a color reproduction range according to each type of color image output device, and for this reason construction of processing for determination is disadvantageously complicated. Especially in case of a system in which a color image output device connected to an image processing device can easily be replaced with a new one, it is required to change various types of parameter previously set and used for processing for determination each time, which is very troublesome.

Also with the conventional technology as described above, processing for determination is executed for all pixels constituting color image data, and for this reason a long time is required for the processing.

In the method of reducing a size of inputted color image data toward the center of gravity of a space of a color reproduction range as employed in the conventional technology, if most of the inputted color image data is included in the space of color reproduction range, color image data included in the color reproduction range space is changed in the non-color direction due to the effect by data of a few pixels data outside the color reproduction range, so that the output image as a whole may become not so attractive and also the color attractiveness of the entire image may be lost.

With the conventional technology as described above, furthermore when the method of reducing a size of a color image toward the center of gravity of a color reproduction range space is employed, a reduction ratio is automatically decided, so that it is not always possible to obtain a color image the user takes a fancy for.

In addition, with the conventional technology described above, when a color image input device or a color image output device connected thereto is replaced with a different one, or when a color image output device changes as time goes by or due to some environmental factors, rapid countermeasures can not be taken.

Also in case of an output device required to frequently process human images, if parameters are decided taking a skin color seriously, an error to colors used to an image other than a human image may becomes larger, which is also unadvantageous for optimal color processing. Namely it is impossible to select parameters most suited to a pattern to be reproduced. Also if a color reproduction range (gamut) for an input signal is wider than that in an output device, as shown in FIG. 22, a color reproduction range for an output signal is reduced homogeneously, so that even portions of an image having colors to be reproduced accurately are reduced, causing a problem of color displacement.

SUMMARY OF THE INVENTION

It is a first object of the present invention to make it possible to easily construct parameters used for making a determination as to whether inputted color image data is within a color reproduction range of a color image output device or not as well as to easily execute processing for determination.

It is a second object of the present invention to make it possible to realize high speed processing for determination as well as to prevent the entire color image from losing the color attractiveness due to effect by data of a few pixel data outside the color reproduction range.

It is a third object of the present invention to prevent general entire color attractiveness from being lost because of compression of a color image.

It is a fourth object of the present invention to make it possible for a user to set an allowable reduction ratio so that the user can obtain a color image the user takes a fancy for.

It is a fifth object of the present invention to make it possible to rapidly take necessary means against historical changes or changes due to environmental factors in a connected color image output device or when a connected color image input device or a color image output device is replaced with another one.

It is a sixth object of the present invention to enable color correction most suited to an image pattern.

It is a seventh object to enable automatic color correction most suited to an image pattern.

In order to achieve the object as described above, an image processing apparatus according to the present invention executes processing in a direction reverse to that in a color image output apparatus with a virtual device means and makes a determination as to whether input color image data is within a color reproduction range in the color image output device according to output color image data from the virtual device means with a discriminating means.

An image processing apparatus according to the present invention enables high speed computing by dividing a homogeneous color space into a plurality of regions with inputted color image data present in each region represented by one representative data for each region and using the representative data (representative point of an image). Also the image processing apparatus counts a number of pixels in input color image data present in a region for each region, makes a determination as to whether the representative data is within a color reproduction range of a color image output device or not, obtains a ratio of a total number of pixels corresponding to representative data discriminated as outside the color reproduction range and a number of all pixels in the inputted color image, and linearly reduces a size of the inputted color image data when the obtained ratio exceeds a specified value (threshold value).

An image processing apparatus according to the present invention reduces loss of color attractiveness when a size of an image is reduced by increasing a compression ratio more to data further from a reference point for compression by enabling change of a compression ratio for each region with a linear compression means.

An image processing apparatus according to the present invention executes linear compression, when a user sets a compression ratio with a compression ratio setting means, to input color image data using the compression ratio, and also executes linear compression to input color image data in other cases according to a compression ratio decided by a compression ratio deciding means, so that a user can reduce a size of an image according to a compression ratio having an allowable value.

An image processing apparatus according to the present invention reduces loss of color attractiveness when a size of an image is reduced by computing a compression ration for each region and increasing a compression ratio more to data further from a reference point for compression with a size reduction ratio deciding means.

An image processing apparatus according to the present invention monitors historical changes or changes due to environmental factors in a color image output device, selects appropriate parameters from a plurality of parameters previously set taking into considerations historical changes or changes due to environmental factors in the color image output device, executes processing in a direction reverse to that in the color image output device with a virtual device means, and makes a determination as to whether input color image data is within a color reproduction range in the color image output device or not according to output color image data from the virtual device means with a discriminating means.

An image processing device according to the present invention executes processing in a direction reverse to that in a color image output device with a virtual device means. Also the image processing device measures historical changes or those due to environmental factors in a color image output device, corrects output color image data obtained through processing in the reverse direction described above according to a result of measurement, and makes a determination as to whether input color image data is within a color reproduction range in the color image output device or not according to the output color data after correction with a discriminating means.

An image processing apparatus according to the present invention selects colors in input image data with an operating means and executes color correction most suited to an image pattern by computing with a parameter computing means parameters according to the colors selected by the operating means.

An image processing means according to the present invention can automatically execute color correction most suited to an image pattern because the operating means selects colors in a central section of an input image consisting of input image data.

An image processing device according to the present invention can automatically execute color correction most suited to an image pattern because the operating means selects colors in a region having the largest area in the input image consisting of input image data.

Other objects and features of this invention will become understood from the following description with reference to the accompanying drawings.

BRIEF DESCRIPTION OF THE DRAWINGS

FIG. 14 is an explanatory view illustrating an sample of configuration for decision of VP parameters in Embodiment 5;

FIG. 15 is an explanatory view illustrating an example of configuration in Embodiment 6;

FIG. 17 is an explanatory view illustrating compression of a color reduction range or the like in Embodiment 7;

FIG. 18 is an explanatory view illustrating a case where central mode for Embodiment 7 is selected;

FIG. 19 is an explanatory view illustrating a case where the maximum mode for Embodiment 7 is selected;

DESCRIPTION OF THE PREFERRED EMBODIMENTS

Description is made for a case in which an image processing apparatus according to the present invention is applied to a color digital image composing apparatus in the order of [Embodiment 1], [Embodiment 2], [Embodiment 3], [Embodiment 4], [Embodiment 5], [Embodiment 6], and [Embodiment 7] with reference to the related drawings.

Figure 1:
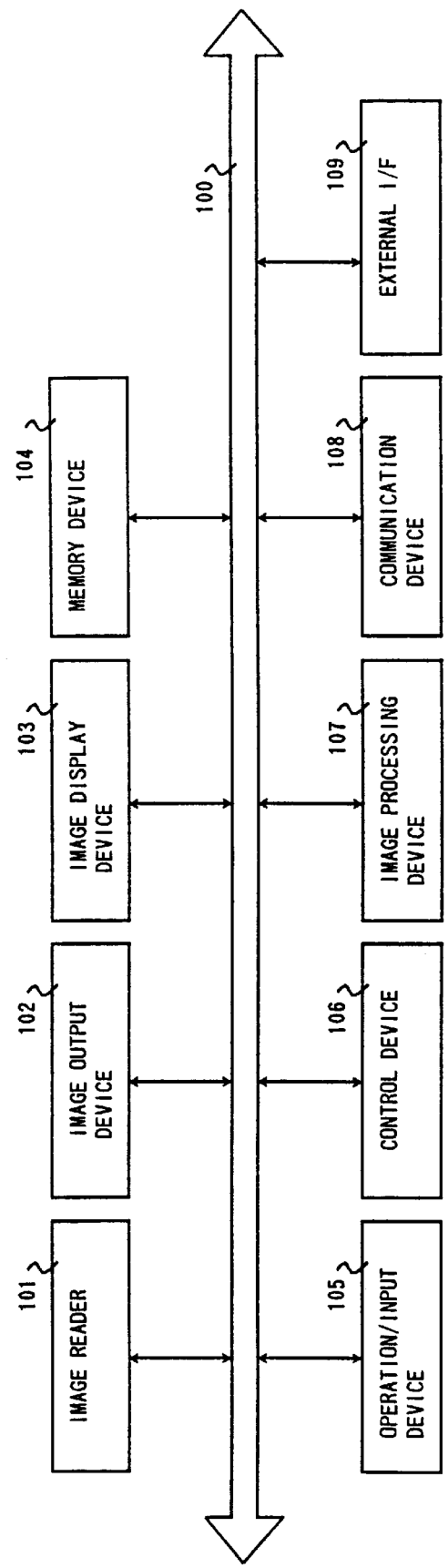
FIG. 1 is a system block diagram illustrating a color digital image composing apparatus incorporating an image processing apparatus according to the present invention.

FIG. 1 is a system block diagram illustrating a color digital image composing apparatus incorporating the image processing apparatus according to the present invention. The color digital image composing apparatus is a system constructed by adding a color facsimile facility with a communicating function or a large capacity storage device to a conventional type of digital color copying machine. Herein description is made for general configuration of the system shown in FIG. 1. Connected to a system bus 100 for delivery of control signals or image data are an image reader 101 for fetching images as digital data such as a scanner, an image output device 102 for forming images on paper or OHP sheet such as a printer, an image display device 103 for displaying and checking images such as a monitor, a memory device 104 such as a hard disk or a magneto-optical disk, an operating/input device 105 for inputting or displaying instructions or parameters for processing for a device, a control device 106 for controlling each device, an image processing device (an image processing device according to the present invention) 107 for processing or editing digital image data, a communication device 108 for connection with a communication network for executing such operations as coding or decoding, and an external I/F (interface) 109 for connection with an external device such as a computer.

With the configuration above, next description is made for operations thereof in the following order;

(1) relation between object image data and a color reproduction range in the image output device 102

(2) construction of a virtual device (VD) in the image processing apparatus 107

(3) processing as to whether input image data is within a color reproduction range or not.

(1) Relation Between Object Image Data and a Color Reproduction Range in the Image Output Device 102

When processing an image in the image processing apparatus 107, object image data (input color image data) is classified to image data prepared on the image display device 103 (such, for instance, computer graphics image data), and that read by the image reader 101 (such as, for instance, R·G·B data for common color copy, or negative data).

Generally image data prepared on the image display device 103 often includes colors having high brightness and high chromaticity not included in the original picture or printed material due to an area of a color reproduction range of the image display device 103 itself. For this reason, a large volume of image data exceeding a color reproducing capability of the image output device 102 for outputting colors is present, so that, when the object is image data prepared on the image display device 103, image processing to the type of image is required.

As the maximum color reproducing capability of the image output device 102 in the system shown in FIG. 1 is fixed, it is necessary to compare a color reproduction range for object image data to that of the image output device 102 when outputting the object image data with the image output device 102. Namely it is necessary to make a determination to what extent the object image data is included in a color reproduction range of the image output device 102.

FIG. 2A to FIG. 2D each show a relation between a color reproduction range in the image output device 102 and object image data. When it is tried to display a color space of object image data in a homogeneous color space (a color space is concentrated into a space), the result is largely classified as follows. It should be noted therein that in the figure the reference numeral 200 indicates a color reproduction range in the image output device 102 for a homogeneous color space CIELAB while the reference numeral 201 indicates a color space of the object image data.

Figure 2B:
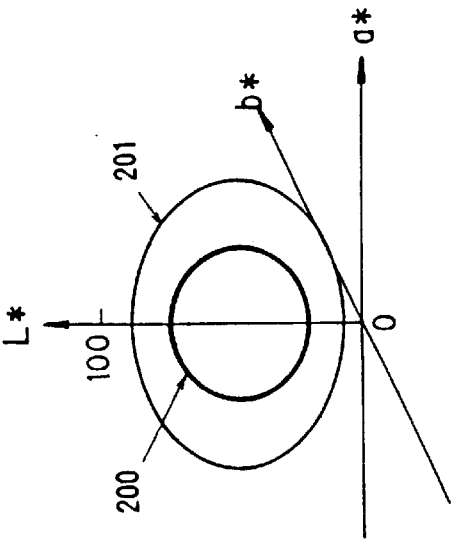
FIG. 2B is an explanatory view illustrating a relation between a color reproduction range in an image output device and object image data.
Figure 2D:
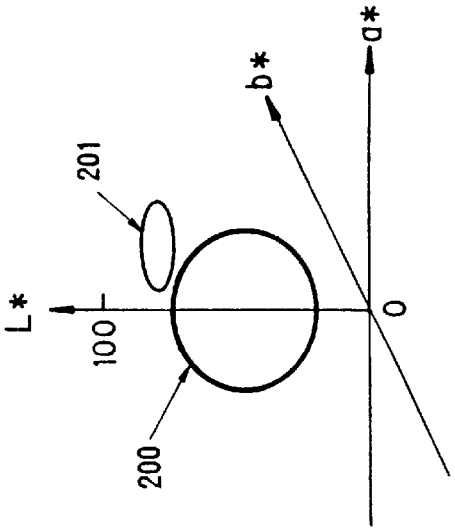
FIG. 2D is an explanatory view illustrating a relation between a color reproduction range in an image output device and object image data.
Figure 2A:
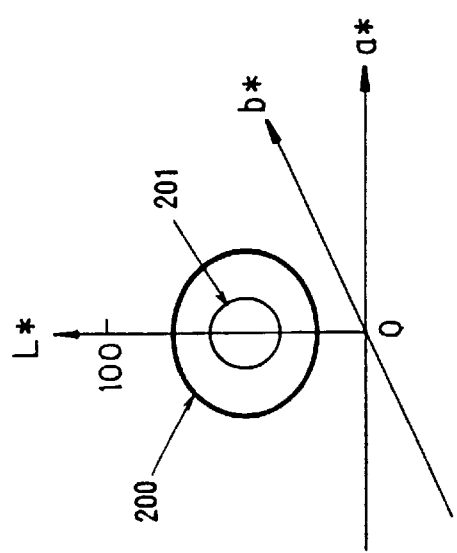
FIG. 2A is an explanatory view illustrating a relation between a color reproduction range in an image output device and object image data.

As shown in FIG. 2A, a color space 201 of the object image data is included in a color reproduction range 200.

As shown in FIG. 2B, the color reproduction range 200 is included in the color space 201 of the object image data.

Figure 2C:
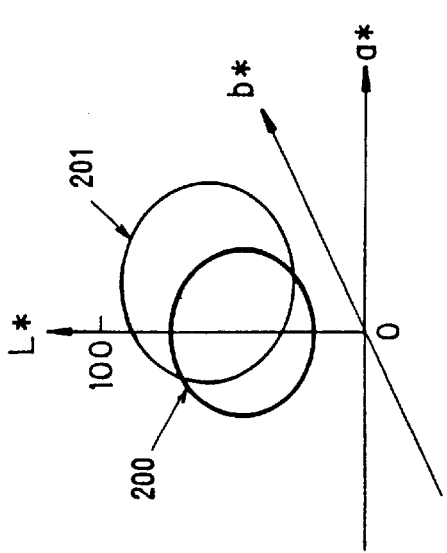
FIG. 2C is an explanatory view illustrating a relation between a color reproduction range in an image output device and object image data.

As shown in FIG. 2C, a portion of the color space 201 of the object image data is included in the color reproduction range 200.

As shown in FIG. 2D, the color space 201 of the object image data is not included in the color reproduction range 200.

FIG. 2A shows a case where the color space 201 of the object image data is included in the color reproduction range of the image output device 102, and in this case the object image data can be outputted as it is, so that the object image data can be outputted through normal color processing (such as conversion of R·G·B to C·M·Y). In FIG. 2B to FIG. 2D, however, a region outside the color reproduction range 200 is included, so that it is necessary to execute processing for virtually narrowing a color reproduction range for the color space 201 of the object image data (This processing is called compression processing hereinafter).

The present invention relates to a determination as to whether the compression processing as described above should be executed or not, and more particularly makes it possible to easily construct parameters used when a determination as to whether object image data is within a color reproduction range in the image output device 102 or not is executed as well as to easily execute the determination above.

(2) Construction of a Virtual Device (VD) in the Image Processing Device 107

Next description is made for a virtual device (VD) used for a determination as to whether object image data is within a color reproduction range of an image output device or not. In Embodiment 1, a virtual image output device (VP: Virtual Printer) is constructed and used as a virtual device in the image processing apparatus 107 shown in FIG. 1.

Figure 3:
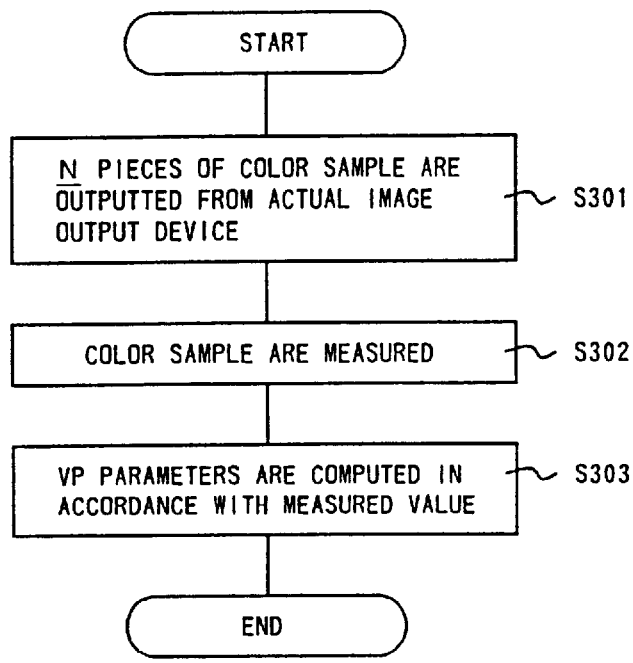
FIG. 3 is a flow chart illustrating a method of preparing a virtual image output device VP.

FIG. 3 is a flow chart illustrating a method of forming a virtual image output device VP. At first, N pieces of color sample are outputted from the actual image output device 102 (S301). Herein 4 patches of color sample comprising three single colors of C, M, and Y and a mixed color in which C, M, and Y are mixed are treated as one set, and a number of sets are outputted so that the maximum color reproduction range of the image output device 102 will be obtained.

Then density c, m, and y of each of the three patches of outputted color sample (three-color printer for c, m, and y assumed in this embodiment) and an L*a*b* value for the mixed color are measured (S302), and parameters for the virtual image output device VP are computed with a neural network using these values as input and output (S303). It should be noted that herein parameters in a case where input in a neural network is c, m, and y and output is L*a*b* are called regular directional VP, and those in a case where input and output are inverted are called reverse directional VP.

Figure 4:
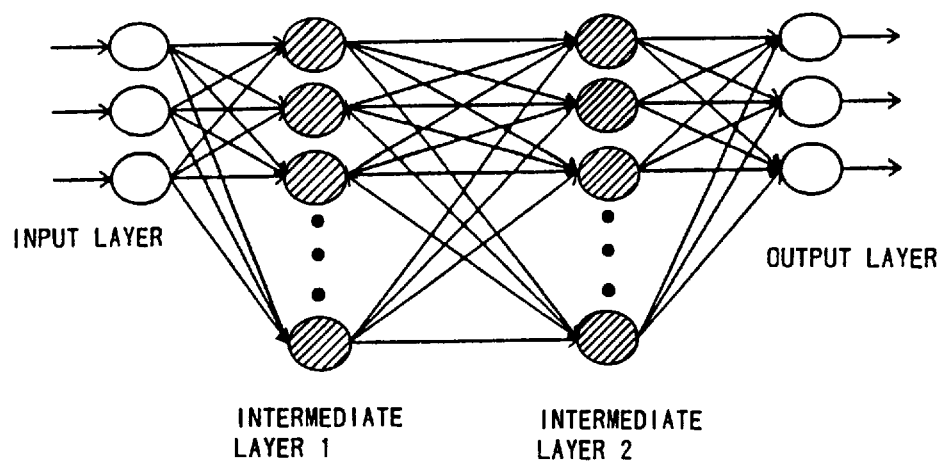
FIG. 4 is an explanatory view illustrating an example of configuration of a virtual image output device VP.

FIG. 4 shows an example of configuration of the virtual image output device VP, which is herein built with a neural network using back propagation therein. The neural network comprises an input layer having an input number p, intermediate layers 1, 2 each having an element q, and an output layer having an output number r. In the present invention, p and r are 3 respectively. Also the above parameters p, q, and r are decided so that the I/O values will become minimum ones.

By using computed parameters, in a regular directional VP, an L*a*b* value expected to be actually outputted from given c, m, and y density data is obtained. Therefore, for reverse directional VP, by inputting the L*a*b* within a color reproduction range of the image output device 102, values for c, m, and y, which are solutions thereof, are also within the measured density data. In other words, when given image data is converted to L*a*b*, if the value is outside the color reproduction range of the image output device 102, at least one of the solutions for c, m, and y is out of the measured density data. For this reason, it is possible to make a determination as to whether given image data is within a color reproduction range of the image output device 102 or not.

Also when reverse directional VP is obtained between RGB and L*a*b*, against L*a*b* input outside the color reproduction range, at least one solution among the output values for R, G, and B is negative or a value larger than 255 (in a case where each value for R, G, and B consists of 8 bits), similarly it is possible to make a determination as to whether given data is within a color reproduction range of the image output device 102 or not.

Figure 5:
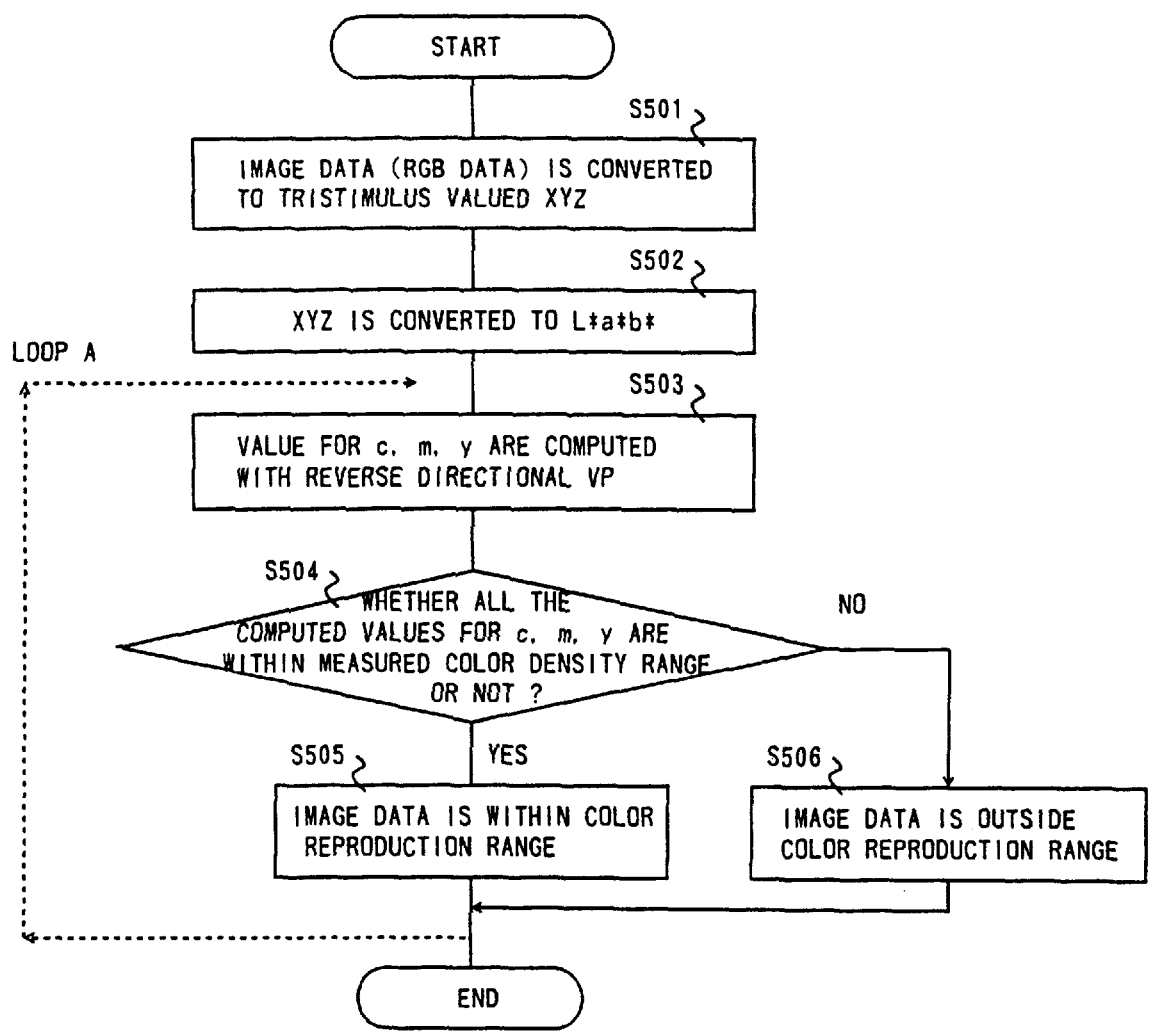
FIG. 5 is a flow chart of an operation for making a determination as to whether input color image data is within a color reproduction range of a color image output device or not using the virtual image output device VP (reverse direction VP) constructed with a neural network shown in FIG. 4.

(3) Processing as to Whether Image Data is Within a Color Reproduction Range or Not Next description is made for an operation for making a determination as to whether image data is within a color reproduction range of an image output device or not by using a virtual image output device VP (reverse directional VP) built with a neural network shown in FIG. 4 with reference to the flow chart shown in FIG. 5. At first, image data (RGB data) is converted to a tristimulus value XYZ (S501), and XYZ is converted to L*a*b* (S502). Then values for c, m, and y are computed with reverse directional VP by a virtual image output device VP (S503).

Then a determination as to whether all the computed values for c, m, and y are within a measured color density range of the image output device 102 or not is executed (S504), and if the values are within the measured density range, it is determined that the image data is within a color reproduction range of the image output device 102 (S505). On the other hand, if the values are outside the measured density range, it is determined that the image data is outside of the color reproduction range the image output device 102 (S506).

Thus, after the determination as to whether given data is within a color reproduction range of the image output device 102 or not is executed, if it is determined that the image data is outside the color reproduction range of the image output device 102 (the relation shown in FIG. 2B to FIG. 2D), compression processing for the object image data is executed, and data is converted so that the image data will be within the color reproduction range of the image output device 102.

In Embodiment 1, as shown above, processing for reverse directional VP against the image output device 102 is executed by a virtual image output device VP, and a determination as to whether all the values for c, m, and y (input color image data) is within the measured density range (i.e., the color reproduction range of the image output device 102) or not is executed in step S504 so that the operation for determination can easily be executed. As a virtual image output device is constructed by also using a neural network, it is possible to easily construct parameters used for a determination as to whether object image data is within a color reproduction range of the image output device 102. Also it is possible to easily change parameters.

In relation to Embodiment 1, as shown in FIG. 5, a case was described in which a determination as to whether object image data is within a color reproduction of the image output device 102 or not is executed and then compression processing is executed if the object image data is outside the color reproduction image of the image output device 102, but if the determination is executed to all the pixels in the object image data when it is decided whether the compression processing is to be executed or not to be executed, the computing load in reverse directional VP becomes larger, and a long time may be required for the determination if the image is large. So in Embodiment 2, a homogeneous color space is divided to a plurality of regions, and object image data present in each region is represented by one representative data to execute high speed computing by using the representative data (a representative point for the image). Also a number of pixels in input color image data present in a region are computed for each region, a determination as to whether the representative data is within the color reproduction range of the image output device 102 or not is executed, a ratio of the total number of pixels corresponding to the representative data recognized as outside the color reproduction range vs the total number of pixels in the object image data is obtained, and when the obtained ration exceeds a specified value (threshold value), linear compression is executed to the object image data.

It should be noted that configuration of Embodiment 2 is the same as that in Embodiment 1, so that illustration and description thereof are omitted herein.

Figure 6:
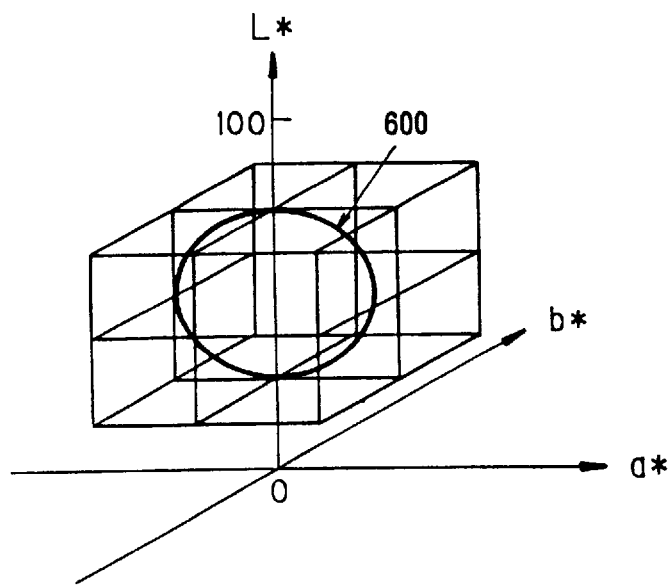
FIG. 6 is an explanatory view illustrating divided spaces in Embodiment 2.

In Embodiment 2, at first, as shown in FIG. 6, a wide color space completely including a color reproduction range 600 of the image display device 103 as well as that of the image output device 102 is previously divided to i×j×k pieces of space (called divided space hereinafter) in the direction of each axis of L*a*b*, and a number of pixels included in each divided space is obtained for all pixels.

Herein assuming conditions for the wide color space above as follows;

$$L_{min} \leq L^* \leq L_{max}$$

$$a_{min} \leq a^* \leq a_{max}$$

$$b_{min} \leq b^* \leq b_{max}$$

division pitches PL, Pa, Pb for each axis are obtained through the following expressions;

$$PL = (L_{max} - L_{min})/i$$

$$Pa = (a_{max} - a_{min})/j$$

$$Pb = (b_{max} - b_{min})/k$$

so that, when input values for a pixel are L0, a0, b0, coordinates for the corresponding divided space Sd can be decided as $$Sd = (int\ (L0/PL),\ int(a0/Pa),\ int\ (b0/Pb))$$

(It should be noted that a section below decimal point for int ( ) is rounded down).

Then, a pixel counter (not shown) corresponding to the divided space Sd counts up by one. When counting up first in a divided space, the L*a*b* value is saved together with the coordinates Sd of the divided space. When counting of all pixels in a corresponding divided space is finished, a determination is made as to whether the entire divided space is within the color reproduction range or not. The L*a*b* value used for the determination above is represented by the center of gravity of the divided space or one of vertexes of the rectangular parallelepiped, and the determination is executed to all the divided spaces.

Figure 7:
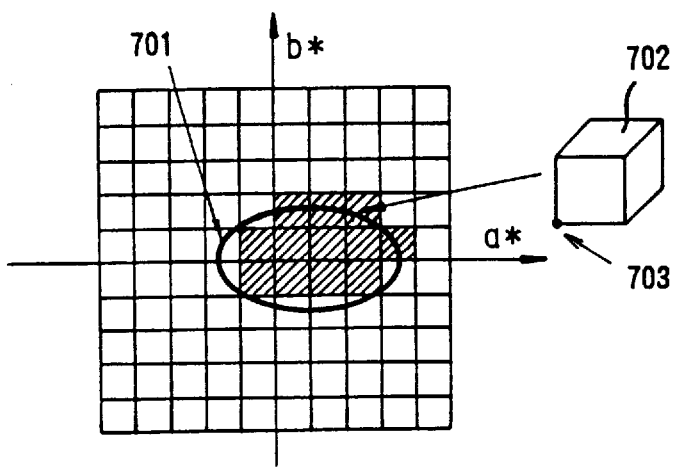
FIG. 7 is an explanatory view showing L*a*b* in FIG. 6 seen from just above and illustrating a representative value of a divided space.

With this operation, as shown in FIG. 7, only the representative value 703 for the divided space corresponding to the object image data is left. FIG. 7 shows the L*a*b* in FIG. 6 seen from the above, and in this figure a*b* is divided to j×k pieces of spaces. When distribution of the object image data is as shown at 701, a space in which the representative value 703 in each divided space 702 is as shown by the shadowed area. Each representative value 703 for the shadowed space is saved.

Then depending on the L*a*b* saved for all the divided spaces in the shadowed area, a determination as to whether object image data is within a color reproduction range of the image output device 102 or not is executed according to the same sequence as that described in relation to Embodiment 1. Concretely, this operation is executed according to a loop from A in FIG. 5. Then the total sum IP of all pixels belonging to divided spaces recognized as within the color reproduction range is obtained, and an inclusion ratio α (=IP/TP) is computed from the total sum IP and the total number of pixels TP in the object image data, and compression processing is executed when the inclusion ratio α exceeds the threshold value Th previously set.

Herein the threshold value Th is set to prevent an image with almost all the pixels included in a color reproduction rage from being compressed due to a few pixels outside the reproduction range.

Figure 8:
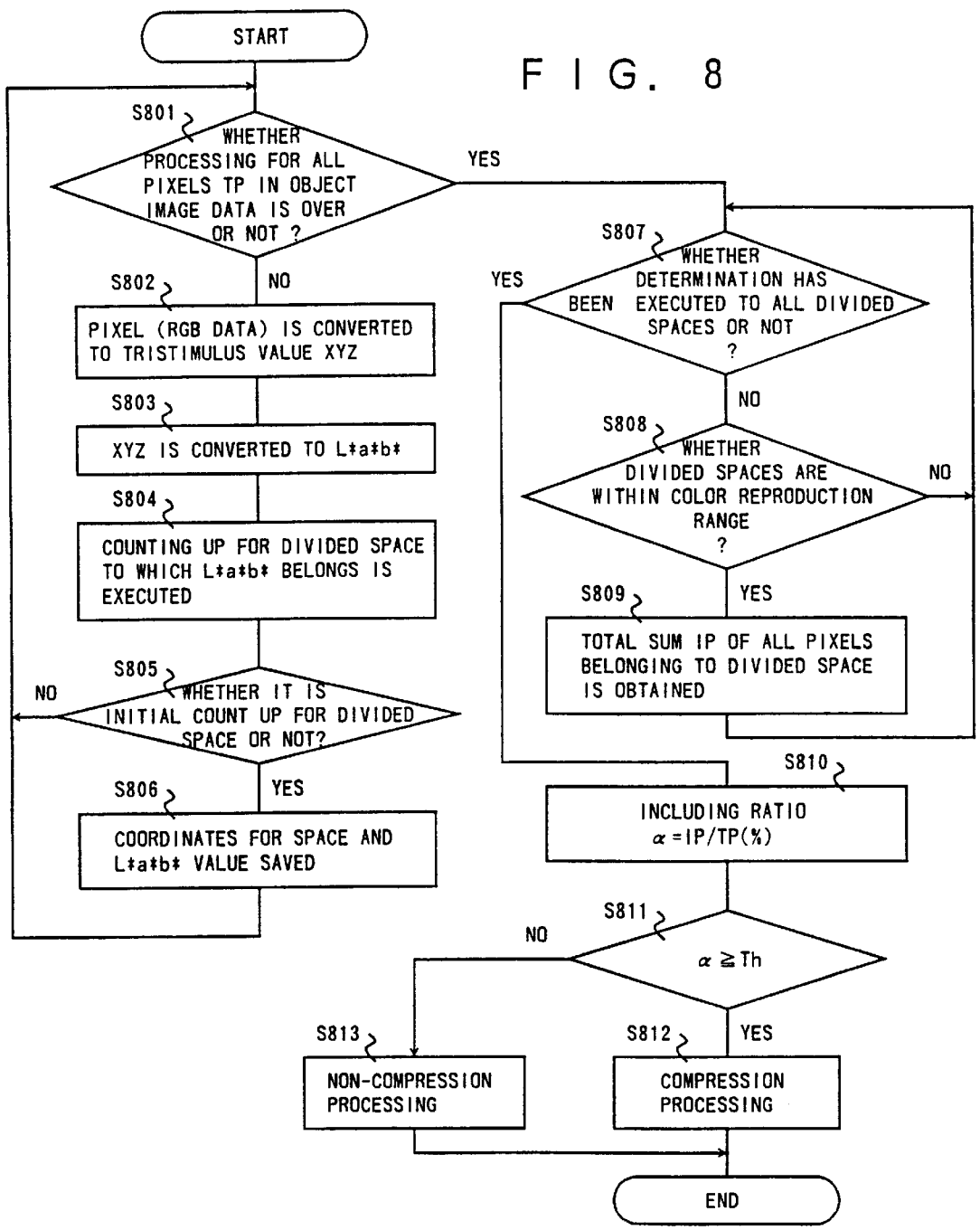
FIG. 8 is a flow chart for an operation for deciding a compression processing comprising steps of saving representative values for each divided space, counting a number of pixels in each divided space, computing an inclusion ratio α, and making a determination as to whether compression is required or not.

FIG. 8 shows a flow chart for operations deciding compression processing compressing steps for saving a representative value for each divided space above, a count of pixels in each divided space, computing the inclusion ration α, and making a determination for the necessity of compression processing. At first an image processing apparatus 107 makes a determination as to whether processing for all pixels TP in object image data is over or not (S801), and the sequence from step S802 to S806 is repeated until processing has been executed to all the pixels TP. If processing has been executed for all the pixels TP, then the system control goes to the step S807.

In steps S802 to S806, a pixel (RGB data) is converted to tristimulus value XYZ (S802), XYZ is converted to L*a*b* (S803), counting up for a divided space to which the L*a*b* belongs is executed (S804), and coordinates for the space and L*a*b* value are saved (S806) in case of initial count up for the divided space (namely if it is first count up) (S805).

In step S807, a determination as to whether the determination has been executed to all the divided spaces or not is executed. If not, a determination as to whether the corresponding spaces are within the color reproduction range or not is executed, and if the divided spaces are within the color reproduction range (S808), the total sum IP of all the pixels belonging to the divided space is obtained (S809), and control returns to step S807.

If the determination has been executed to all the divided spaces, the inclusion ratio α (=IP/TP) is obtained (S810), the inclusion ratio α is compared to the threshold value Th (S811), and if α is equal to or larger than Th, compression processing is executed (S812). On the other hand, if a is smaller than Th, a non-compression processing is executed (S813).

It should be noted that the non-compression processing is an operation for normal image processing other than the compression processing (in steps S911 to S913 described later and shown in FIG. 9).

Figure 9:
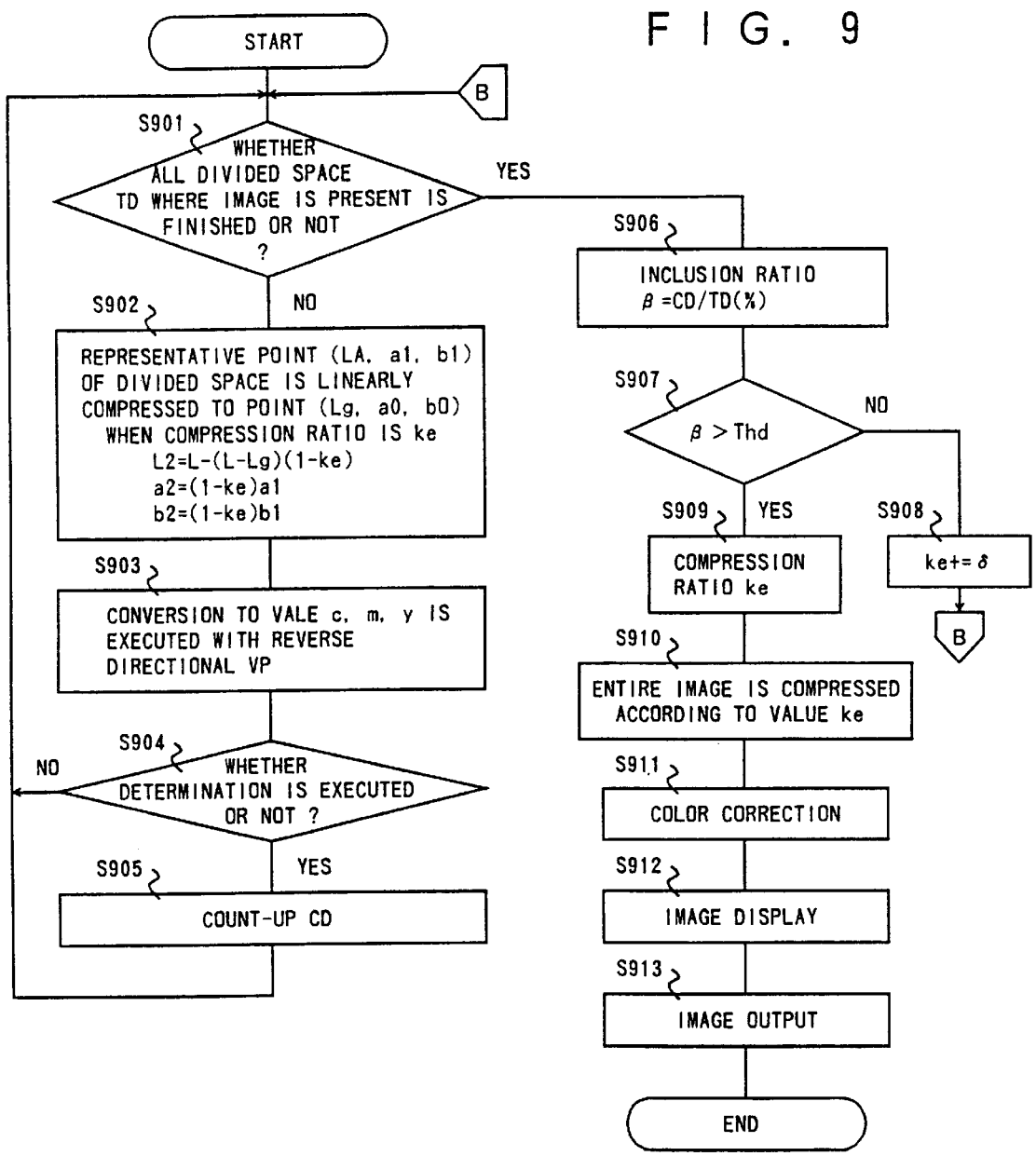
FIG. 9 is a flow chart for an operation for compression in Step S812 in FIG. 8.

Then description is made for the compression processing in step S812 in FIG. 8 with reference to the flow chart in FIG. 9. In the compression processing, a representative point (L1, a1, b1) which is a representative value for each of all the divided space TD where the image is present is linearly compressed to a point (Lg, a0, b0). Herein, assuming that Lg is, for instance, 50 and the compression ratio is ke, the coordinates (L2, a2, b2) after compression can be obtained through the following expressions;

$$L2 = L - (L - Lg)\ (1 - ke)$$

$$a2 = (1 - ke)\ a1$$

$$b2 = (1 - ke)\ b1$$

Then a number of representative points CD included in the color representative range of the image output device 102 is obtained, and also the inclusion ratio β (=CD/TD) is obtained (S901 to S906).

It should be noted that the compression ration ke for the initial time is set to a small value and the compression ratio is made gradually larger by adding a pitch δ to the compression ratio ke until the inclusion ratio β becomes larger than the threshold value Thd (S907, S908, S901 to S906).

When the inclusion ratio β becomes larger than the threshold value Thd, the compression ratio ke then is decided as a compression ratio to be used (S909), and the entire image is compressed according to the value (S910).

Then a color correction is executed (S911), image display is executed on the image display device 103 (S912), and the image is outputted onto recording paper through the image output device 102 (S913).

Figure 10:
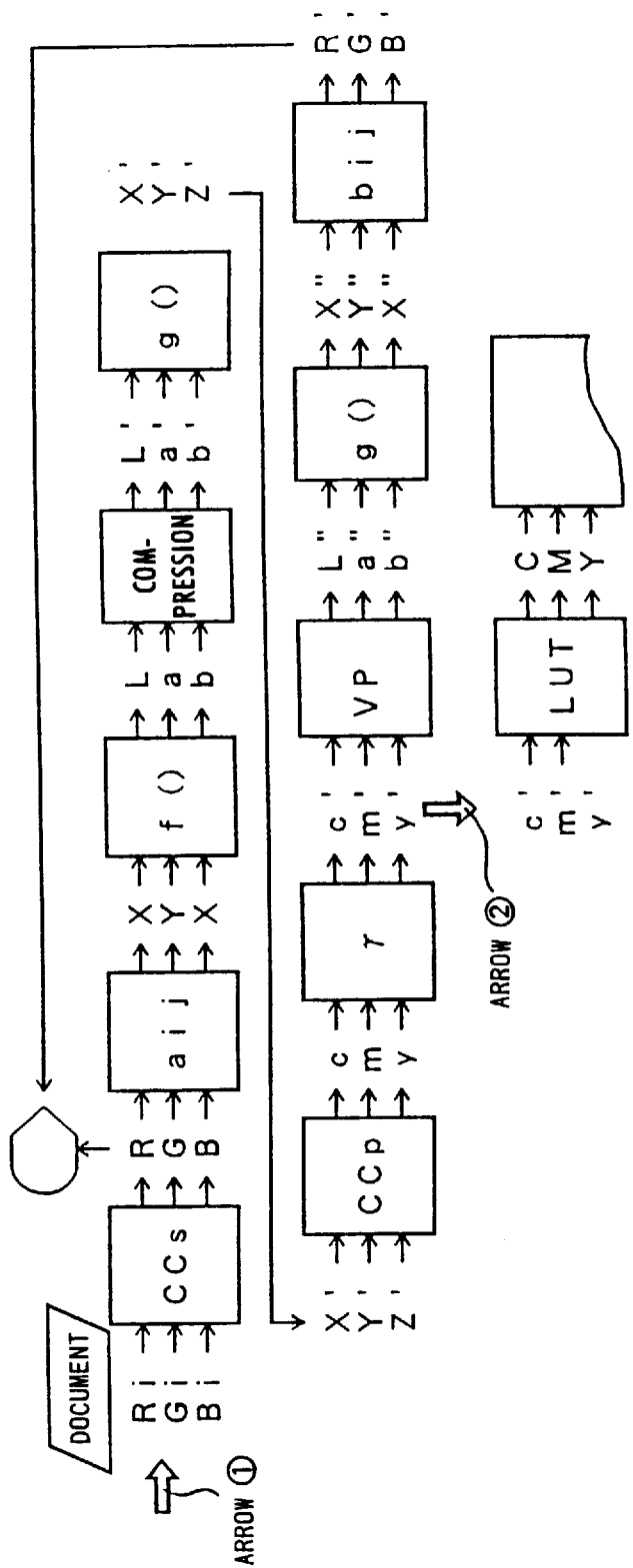
FIG. 10 is an explanatory view showing an image data flow in each of Steps S911 to S913 in FIG. 9.

FIG. 10 shows an image data flow in each processing in steps S911 to S913, and in this figure, the arrow ① shows color correction and image display, while the arrow ② indicates image output. In case of recording paper (for printed material, pictures or the like), the image is read as RGB digital data by the image reader 101 through correction CCs. As the CG image or the like is prepared by using such a device as the image display device 103, it is originally RGB data.

This RGB data is converted to a tristimulus value XYZ through a 3×3 determinant aij, and is furthermore converted to Lab (L*a*b*) through the function f( ). Then Lab (L*a*b*) is compressed through compression processing to L'a'b', and is returned to a tristimulus value X'Y'Z' through the function g( ). Then densities for c, m, and y are obtained through correction CCp in the image output device 102, then the density values are subjected to γ conversion for correct the gray color to obtain c', m', and y', which are converted to L"a"b" by a virtual image output device VP, the values being subjected to conversion through the function g( ) to obtain X"Y"Z" and also to conversion through the inverse matrix bij to obtain R'B'G'.

Namely, the R'B'G' is virtual image formation obtained as output from the actual device (image output device 102) by a virtual image output device VP. This sequence of operations is color processing. Also to display R'B'G' on the image display device 103 is image display. When actually outputting the image onto recording paper, c'm'y' after γ conversion is switched as indicated by the arrow ②, and is passed through a conversion table LUT for transmission to the image output device 102. This operation is image output.

I/O data to and from a virtual image output device VP can be constructed in addition to the density values for c,m and y as in the present invention, as an integral value for a reflection factor for each single color or RGB data. As data forming a pair therewith, also data other than L*a*b* is allowable. Also the I/O data can be constructed by a three-color system for cmy or a four-color system of cmyk, and in that case, it is necessary to change color processing according to the I/O data.

As described above, in Embodiment 2, in addition to effect in Embodiment 1, an operation for determination can be executed at a higher speed, and also it is possible to prevent color attractiveness of a color image from being lost due to effect by data of a few pixels outside the color reproduction range. Also loss of color attractiveness due to compression of a color image can be prevented.

It should be noted that, as a method of dividing a space, a dividing method in which a width of division becomes larger as a position of division goes further from a reference point in one axial direction may be employed in addition to homogeneous division.

Embodiment 3 is different from Embodiment 2 in the point that a way of division can be changed according to each divided space. It should be noted that the basic configuration and operations thereof are the same as those in Embodiment 2 and description is made for only different portions thereof.

Figure 11A:
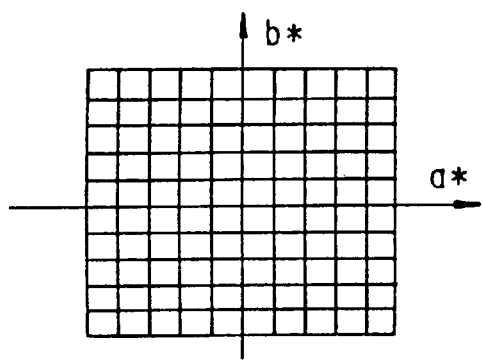
FIGS. 11a–d are an explanatory view illustrating an operation for setting an auxiliary compression ratio in Embodiment 3.
Figure 11B:
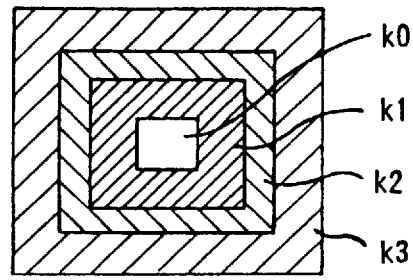
Figure 11C:
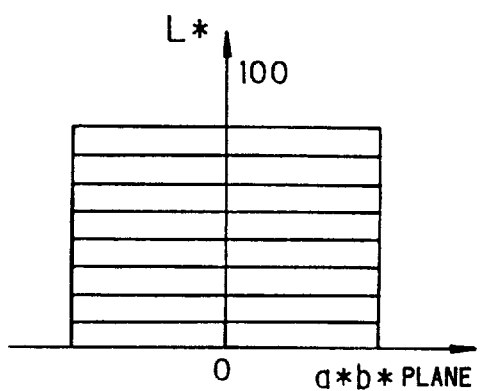
Figure 11D:
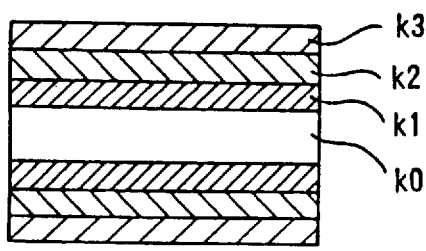

In Embodiment 2, as shown in FIG. 11A, divided spaces each including a wider color space are set. In Embodiment 3, as shown in FIG. 11B, an auxiliary compression ratio is previously set for each of the regions shown as 4 stages in the figure so that a compression ratio becomes higher as a region goes further from the origin in the direction of saturation. Also an auxiliary compression ratio is set in the L* axis as shown in FIG. 11C and FIG. 11D with (Lg, 0,0) as the center. Description is made for the auxiliary compression ratio. For instance, in FIG. 11B, the auxiliary compression ratio is set with 4 steps, and assuming that the auxiliary compression ratio corresponding to each level is k0 to k3 as a step goes further from the center, when the compression ratio is ke, a compression ratio for each space computed with a*b* is k (1−ke), k1 (1−ke), k2 (1−ke), and K3 (1−ke).

It should be noted that an auxiliary compression ratio for each step is adjusted for the corresponding divided space not to enter. Assuming that the compression ratio is 20%, and also assuming that k0=1, k1=0,875, k2=0.75, k3=0.625, as ke is 0.2, so that a product of each auxiliary compression ratio by (1−ke) is 0.8, 0.7, 0.6, and 0.5 respectively. From the compression ratio is 20%, 30%, 40% and 50% respectively from the inner side.

Figure 12:
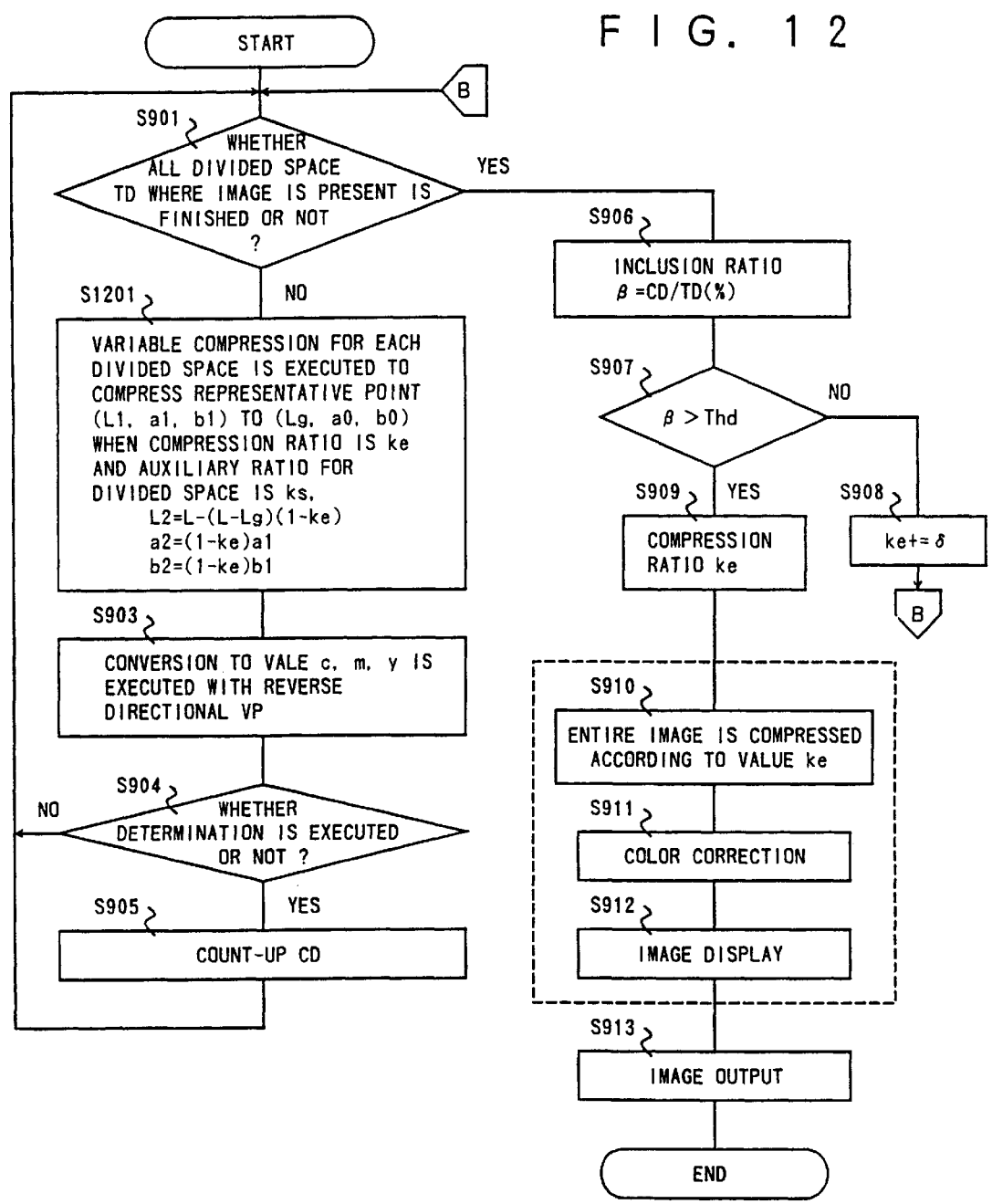
FIG. 12 is a flow chart for compression in Embodiment 3.

FIG. 12 shows a flow chart for compression processing in Embodiment 3, and the compression processing is basically the same as that in Embodiment 2 shown in FIG. 9, and the same reference numeral indicates the same processing, so that herein description is made for only different portions. Variable compression for each the divided spaces is executed to compress a representative point (L1, a1, b1) which is a representative value foe each of all the divided space TD where the image is present to a point (Lg, a0, b0) (S1201). Herein assuming that Lg is, for instance, 50, the compression ratio is ke, and the auxiliary compression ratio for the divided space is Ks, coordinates (L2, a2, b2) after compression can be obtained as described below.

$$L2 = L - (L - Lg)(1 - ke)\,ks$$

$$a2 = (1 - ke)\,ks \cdot a1$$

$$b2 = (1 - ke)\,ks \cdot b1$$

Then, like in Embodiment 2, a number of representative points CD included in a color reproduction range of the image output device 102 is obtained, and then the inclusion ratio β (=CD/TD) is obtained (S901 to S906).

As described above, in Embodiment 3, by making a compression ratio for each region variable in linear compression by setting an auxiliary ratio so that a compression ratio for data further from a reference point for compression becomes larger, it is possible to reduce loss of color attractiveness when an image is compressed. In other words, it is possible to present color attractiveness of the entire image from being lost when a color image is compressed.

Figure 13:
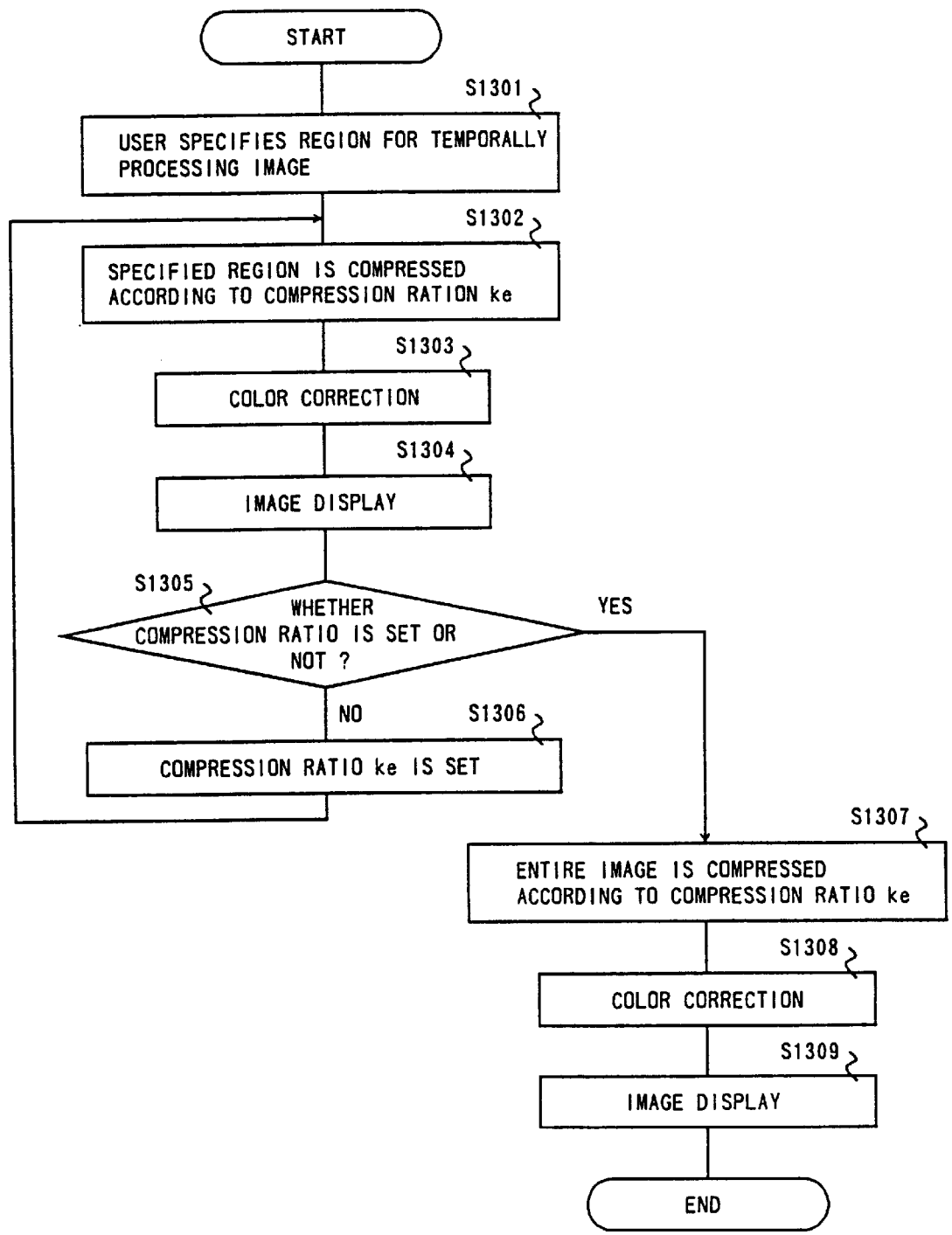
FIG. 13 is a flow chart illustrating a portion of compression processing in Embodiment 4.

In Embodiment 4, the steps S910 to S912 enclosed by a dotted line in the flow chart for compression processing in Embodiment 3 are replaced with steps S1301 to S1309 shown in FIG. 13.

In Embodiment 3, a compression ratio is automatically computed to execute image display and image output, but some users may hope clearly outputting a high density section more than preventing the general color attractiveness from being deteriorated. For this reason, in Embodiment 4, a user can select a compression ratio kef to be applied finally to the image data with reference to the compression ratio ke as a reference for compression.

At first, when a user specifies a region for temporally processing an image for checking a state after compression processing with an operating/input device 105 (S1301), the specified region is compressed according to the compression ratio ke (S1302), color correction is executed (S1303), and image display is executed (S1304). The user checks this image displayed on the image display device 103, and sets a compression ratio ke through the operating/input device 105 if the image does not have a desired color tone (S1305, S1306). Then, control returns to step S1302, wherein the specified region is compressed according to the specified compression ratio ke, and then the sequence after step S1303 is repeated.

On the other hand, if the displayed image is a desired one, the user presses down a specified key on the operating/input device 105 to instruct completion of compression ratio setting (S1305), when the entire image is compressed according to the compression ratio kef which is the compression ratio ke then (S1307), color correction is executed (S1308), and image display is executed (S1309).

In Embodiment 4, as described above, when a user sets a compression ratio through the operating/input device 105 (compression ratio setting means), linear compression is executed to the image data according the compression ratio, and in other cases, linear compression is executed to the image data according to a compression ratio automatically decided, so that, in addition to effects in Embodiment 3, image compression can be carried out according to a compression ratio having a value acceptable to the user. In other words, a user can set a compression ratio acceptable to the user, the user can obtain a color image the user takes a fancy for.

The image output device 102 does not always provide the same output to a constant input (CMY data). This phenomenon occurs because of historical change of the image output device 102 and changes in environmental factors when output is provided. Also causes for historical changes are classified to those causing long term, medium term, and short term changes. In case of, for instance, a copying machine, representative causes include changes in a feed rate of toner or voltage loaded to a photosensitive drum.

In Embodiment 5, in addition to configuration in Embodiment 1 to Embodiment 4, a sensor for measuring historical changes as described above, and a sensor for measuring environmental factors (such as a humidity sensor) are provided in the image output device 102, so that an image satisfying current conditions of the output machine (image output device 102) can virtually be made by using the sensor data measured by the sensors to the virtual image output device VP.

Concretely the image output device 102 is provided in an environmental room, where image output is executed or historical change is generated by carrying out, for instance, an acceleration test, and sensor data is measured.

Then the sensor data is classified to several cases according to types of environmental change and historical change, VP parameters are computed for each case, and are compiled into a library for storage.

And most suited VP parameters are extracted from the sensor data obtained during the actual operation, and are used for image processing.

FIG. 14 shows an example of configuration for deciding VP parameters in Embodiment 5. When sensor data is inputted from a sensor group (sensor 1 to sensor n) provided in the image output device 102, a sensor data processing section 1401 makes a determination as to situation of environmental or historical changes according to the sensor data, and outputs an address for each VP parameter suited to the situation discriminated as described above. Stored in a VP library 1402 are VP parameters previously classified to several cases according to types of environmental or historical change as library data, and when an address for VP parameter is inputted from the sensor data processing section 1401, a corresponding VP parameter is outputted.

The virtual image output device VP shown in FIG. 10 executes processing for reverse directional VP using VP parameters outputted from the VP library 1402, and virtually makes an image satisfying the current conditions of the image output device 102.

In Embodiment 5, as described above, necessary measures can rapidly be taken against historical changes or environmental changes in a connected image output device. Also, for instance, even if a connected image output device is replaced with a new one, optimal VP parameters are automatically selected according to sensor data of a newly installed image output device, so that optimal image compression processing can be executed.

In Embodiment 6, to execute optimal processing according to historical changes or environmental changes, in addition configuration in Embodiment 1 to Embodiment 4, a group of sensors (sensor 1 to sensor n) each for measurement of historical changes and environmental changes and a historical change/environment correcting section 1501 for correcting image data (L*a*b*) after processing by the virtual image output device VP according to sensor data from the group of sensors above are provided.

Input density values for c, m, and y are converted to L*a*b* by the virtual image output device VP. Then sensor data is fetched in and corrected data L*'a*'b*' is obtained by the historical change/environment correcting section 1501.

With Embodiment 6, as described above, necessary measures can rapidly be taken against historical changes or environmental changes in a connected image output device. Also, for instance, even if a connected image output device is replaced with a new one, image data is corrected according to sensor data form a newly installed image output device, so that optimal image compression processing can be executed.

Figure 16:
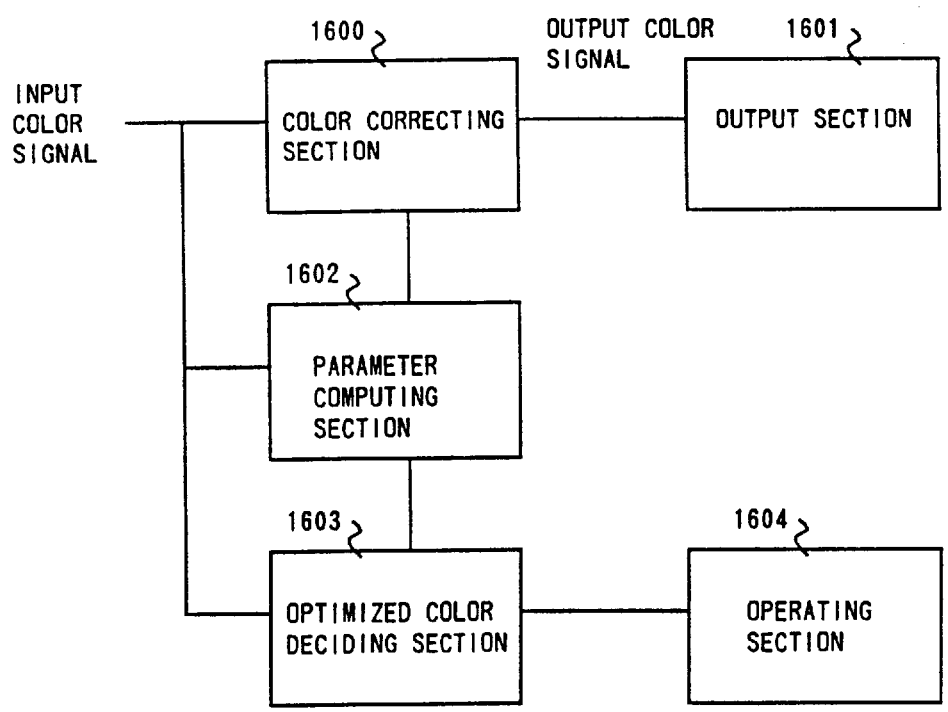
FIG. 16 is a block diagram illustrating an example of configuration in Embodiment 7.

Description is made for general configuration of Embodiment 7 with reference to FIG. 16. A color correcting section 1600, which is a color correction circuit, executes color correction to an inputted input color signal according to parameters set previously, and outputs as an output color signal. An output section 1601, which is a printer, records an image on recording paper according to the inputted output color signal. A parameter computing section 1602, which is a parameter computing section, uses an optimized color instructed as a fixed point as shown in a color space in FIG. 17, compresses a color reduction range or computes parameters from a gamut of an input signal as well as from a gamut of an output device each set previously according to this fixed point, and sets parameters in the color correcting section 1600.

An optimized color deciding section 1603, which is an optimized color deciding circuit, decides either a color of the central portion of the image such as a face as shown in FIG. 18 or a color of a portion having the maximum area such as a blue sky as shown in FIG. 19 as an optimized color according to an instruction, and gives an instruction as the optimized color to the parameter computing section 1602. An operating section 1604, which is an operating panel, has a switch provided therein for selecting the central mode in which a color of the central portion of an image is specified as an optimized color or the maximum mode in which a color of a portion having the maximum area is specified as an optimized color and gives an instruction of either mode to the optimized color deciding section 1603 with usually the central mode selected.

Figure 20:
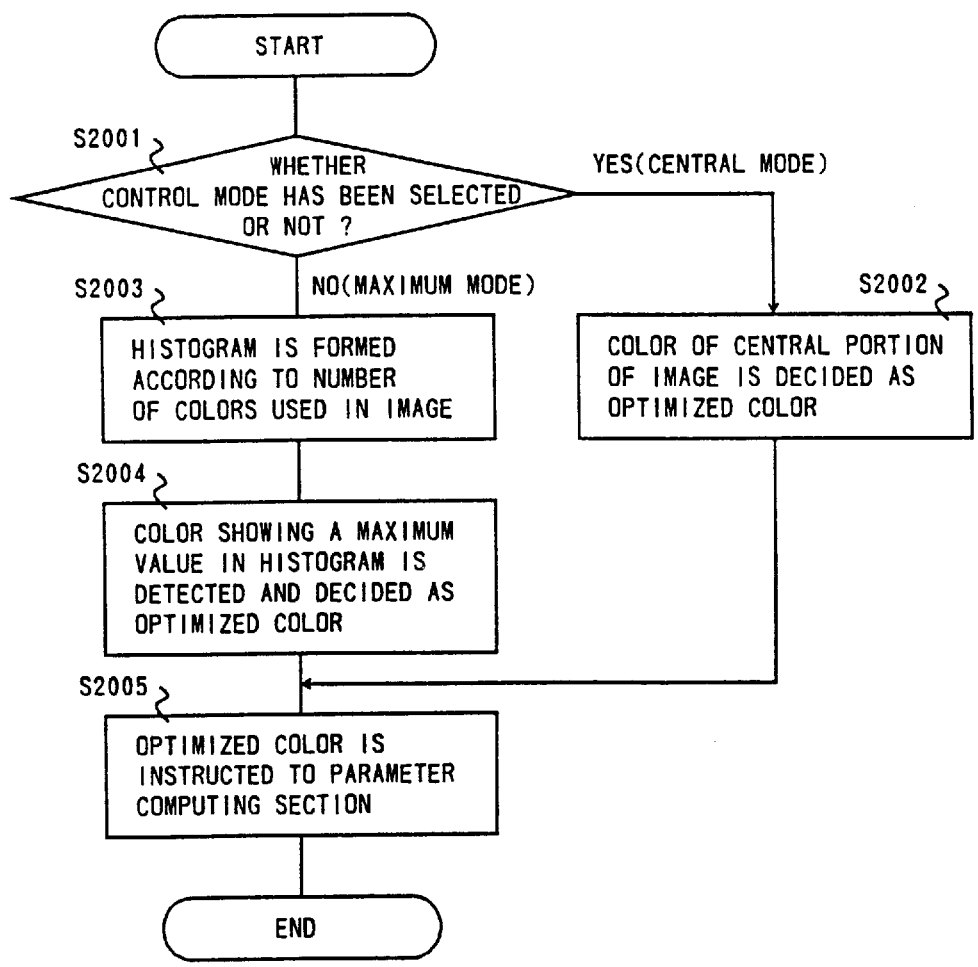
FIG. 20 is a flow chart illustrating a control operation by an optimized color deciding means in Embodiment 7.

Next description is made for controlling operations by the optimized color deciding section 1603 with reference to the flow chart shown in FIG. 20. At first an instructed mode is detected, namely a determination as to whether the central mode has been selected or not is made (S2001). In step S2001, if it is determined that the central mode has been selected, a color of the central portion of an image is decided as an optimized color (S2002). On the contrary, if it is determined that the central mode has not been selected in step S2001, namely if the maximum mode has been selected, a histogram is formed according to a number of colors used in the image (S2003). Then, a color showing a maximum value in the histogram (a color of a portion having the maximum area in the image) is detected and decided as an optimized color (S2004), gives an instruction for the optimized color to the parameter computing section 1602 (S2005), and then terminates the operational sequence.

Figure 21:
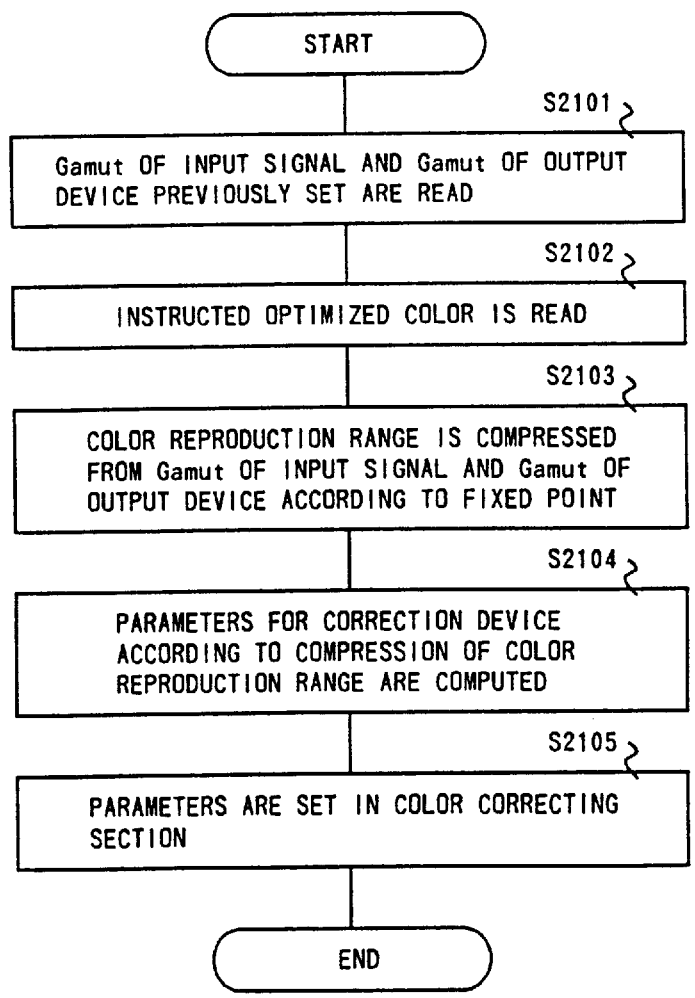
FIG. 21 is a flow chart illustrating a control operation by a parameter computing means in Embodiment 7.
Figure 22:
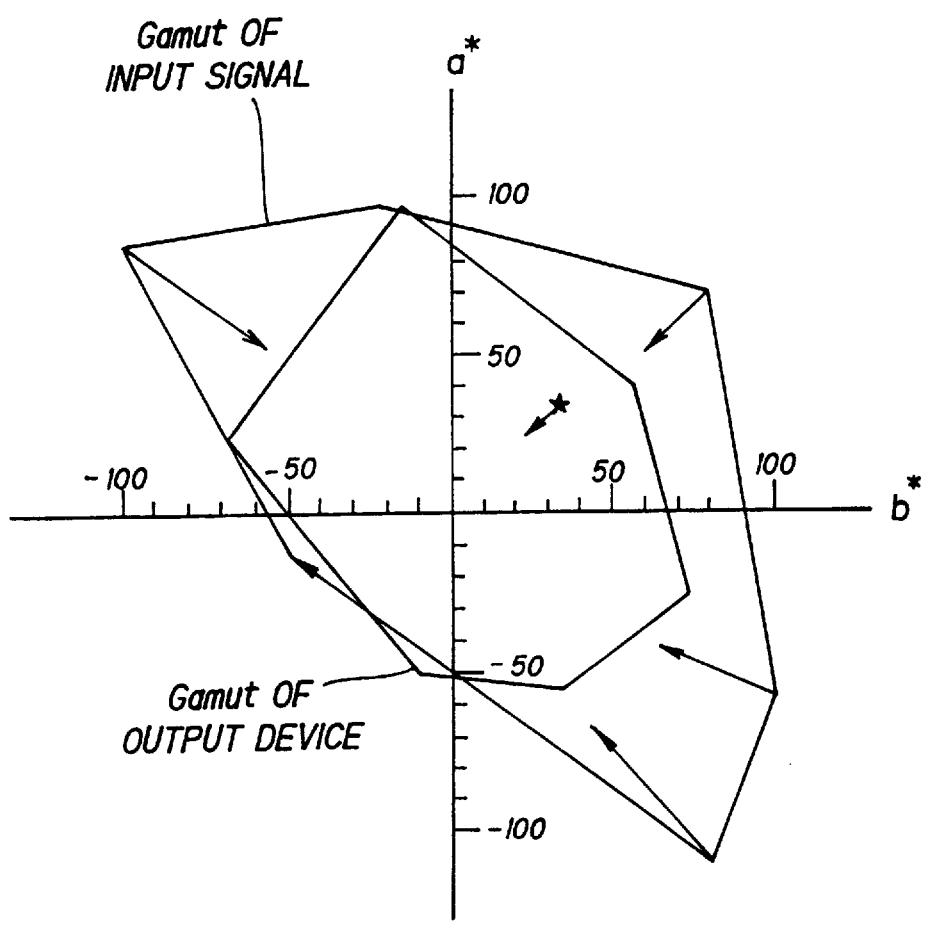
FIG. 22 is an explanatory view for compression of a color reproduction range or the like in the conventional technology.

Next description is made for controlling operations by the parameter computing section 1602 with reference to the flow chart in FIG. 21. At first, gamut of an input signal and that of an output device previously set are read (S2101), and then the instructed optimized color is read (S2102). Then the optimized color is used as a fixed point as shown in a color space in FIG. 17, and a color reproduction range is compressed from the gamut of the input signal and that of the output device according to this fixed point (S2103). Then, parameters for correction decided according to compression of a color reproduction range are computed (S2104), and the parameters are set in the color correcting section 1600 (S2105).

There are various methods of compressing a color reproduction range, such as a method in which the brightness and saturation are homogeneously compressed with the hue unchanged, or a method in which a color reproduction range is assumed as an elastic body and the image is subjected to elastic deformation, and any other method may be available. As a method of computing parameters, for instance, the least square method in which there is a restriction that the fixed point is a minimum error may be used.

As described above, the image processing apparatus according to the present invention executes processing in a direction reverse to that in a color image output device with a virtual device, and makes a determination as to whether input color image data is within a color reproduction range of the color image output device or not according to color image data outputted from the virtual device, so that it is possible to easily construct parameters used for a determination as to whether input color image data is within a color reproduction range of a color image output device or not and also to easily execute the determination.

The image processing device according to the present invention divides a homogeneous color space into a plurality of regions, has color image data present in each region represented by one representative data, and uses the representative data (a representative point of the image), so that high speed computing can be executed. Furthermore the image processing device counts a number of pixels in input color image data present in a region for each region, makes a determination as to whether the representative data is within a color reproduction range of a color image output device or not, obtain a ratio of the total number of pixels corresponding to the representative data recognized as outside the color reproduction range vs a number of all pixels in the input color image data, and executes a linear compression to the input color image data when the obtained ratio exceeds a specified value (threshold value), so that it is possible to prevent general color attractiveness of a color image from being lost due to effect by data of a few pixels outside the color reproduction range.

The image processing device according to the present device can changes a compression ratio for each region with a linear compression unit and make a compression ratio larger to data further from a reference point for compression, so that it is possible to reduce loss of color attractiveness when an image is compressed.

The image processing apparatus according to the present invention executes, when a user sets a compression ratio through a compression ratio setting unit, linear compression to input color image data using the compression ratio, and also executes in other cases linear compression to input color image data according to a compression ratio decided by the compression ratio deciding unit, so that it is possible to set a compression ratio acceptable to a user and to obtain a color image the user takes a fancy for.

The image processing apparatus according to the present invention can compute a compression ratio for each region with the compression ratio deciding unit and make a compression ratio larger for data further from a reference point for compression, so that it is possible to reduce loss of color attractiveness when an image is compressed.

The image processing apparatus according to the present invention measures historical changes or environmental changes in a color image output device, selects optimal parameters from a plurality of parameters previously set taking into consideration the historical changes of or environmental changes for the color image output device, executes processing in a direction reverse to that in the color image output device with a virtual device, and makes a determination with a discriminating unit as to whether input color image data is within a color reproduction range of a color image output device or not according to color image data outputted from the virtual device, so that necessary measures can rapidly be taken when a connected color image input device or a color image output device is replaced with a new one, or against historical changes of or environmental changes for a connected color image output device.

The image processing device according to the present invention executes processing with a virtual device in a direction reverse to that in a color image output device. Also the image processing apparatus measures historical changes of or environmental changes for a color image output device, corrects output image data obtained through processing in the reverse direction described above according to a result of measurement above, and makes a determination with a discriminating unit as to whether input color image data is within a color reproduction range of a color image output device or not according to the output color image data after correction, so that necessary measures can rapidly be taken when a corrected color image input device or a color image output device is replaced with a new one, or against historical changes of or environmental changes for a connected color image output device.

The image processing apparatus according to the present invention selects colors in input image data with an operating unit, and computes parameters with a parameter computing unit according to colors selected by the operating unit, so that it is possible to execute color correction most suited to an image pattern.

The image processing apparatus according to the present invention selects with an operating unit a color of the central portion of an input image comprising input image data, and also selects a color of a portion having the maximum area in an input image comprising input image data, so that it is possible to execute color correction most suited to an image pattern.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus comprising:
   a virtual device for receiving input color image data, for executing processing in a direction reverse to that in a color image output device, and for outputting output color image data based on said input color image data, said output color image data being in the color space of color image data input into said output color device, said color space having a plurality of dimensions;
   a discrimination unit for making a determination as to whether said input color image data is within a color reproduction range according to individual comparisons of values of said output color image data from said virtual device in each of said dimensions in the color space and respective ranges in the color space of the color image output device; and
   a color corrector for correcting the input color image data to be within the color reproduction range of the color image output device according to said determination that the input color image data is within the color reproduction range of the color image output device.

2. An image processing apparatus comprising:
   a virtual device for receiving input color image data, for executing processing in a direction reverse to that in a color image output device, and for outputting output color image data based on said input color image data, said output color image data being in the color space of color image data input into said output color device, said color space having a plurality of dimensions;
   a discrimination unit for making a determination as to whether said input color image data is within a color reproduction range according to individual comparisons of values of said output color image data from said virtual device in each of said dimensions in the color space and respective ranges in the color space of the color image output device;
   an operating unit for selecting a color in said input color image data;
   a parameter computing unit for computing parameters according to a color selected by said operation unit; and
   a color corrector for correcting the input color image data using said parameters to be within the color reproduction range of the color image output device according to said determination that the input color image data is within the color reproduction range of the color image output device.

3. An image processing apparatus according to claim 2, wherein said operating unit selects a color at the central portion of an input image comprising input color image data.

4. An image processing apparatus according to claim 2, wherein said operating unit selects a color of a portion having the maximum area in an input image comprising input color image data.

5. An image processing apparatus comprising:
   a color corrector for executing color correction for correcting input color image data using parameters so that the input color image data will be within a color reproduction range of a color image output device;
   an image data representing unit for dividing a homogeneous color space into a plurality of regions and having said input color image data present in each region represented by one representative data;
   a pixel number counting unit for counting a number of pixels in said input color image data present in a region for each said region;
   a discriminating unit for making a determination as to whether said representative data is within a color reproduction range of said color image output device;
   a ratio computing unit for computing a ratio of the total number of pixels corresponding to representative data discriminated by said discriminating unit as not inside the color reproduction range vs a number of all pixels in said input color image data; and
   a linear compression unit for executing linear compression to said input color image data when the ratio obtained by said ratio computing unit exceeds a specified value.

6. An image processing apparatus according to claim 5, wherein said linear compression unit can change a compression ratio for each said region.

7. An image processing apparatus comprising:
   a color corrector for executing color correction for correcting input color image data using parameters so that the input color image data will be within a color reproduction range of a color image output device;
   an image data representing unit for dividing a homogeneous color space into a plurality of regions and having said input color image data present in each region represented by one representative data;
   a pixel number counting unit for counting a number of pixels in said input color image data present in a region for each said region;
   a discriminating unit for making a determination as to whether said representative data is within a color reproduction range of said color image output device;
   a ratio computing unit for computing a ratio of the total number of pixels corresponding to representative data discriminated by said discriminating unit as not inside the color reproduction range vs a number of all pixels in said input color image data;
   a linear compression unit for executing linear compression to said input color image data when the ratio obtained by said ratio computing unit exceeds a specified value;
   an operating unit for selecting a color in said input color image data; and
   a parameter computing unit for computing parameters according to the color selected by said operating unit.

8. An image processing apparatus according to claim 7, wherein said linear compression unit can change a compression ration for each said region.

9. An image processing apparatus according to claim 7, wherein said operating unit select a color of the central portion of an input image comprising input color image data.

10. An image processing apparatus according to claim 7, wherein said operating unit selects a color of a portion having the maximum area in an input image comprising input color data.

11. An image processing apparatus comprising:
    a color corrector for executing color correction for correcting input color image data so that the input color image data will be within a color reproduction range of a color image output device;
    an image data representing unit for dividing a homogeneous color space into a plurality of regions and having said input color image data present in each region represented by one representative data;

a pixel number counting unit for counting a number of pixels in said input color image data present in a region for each said region;

a discriminating unit for making a determination as to whether said representative data is within a color reproduction range of said color image output device;

a ratio computing unit for computing a ratio of the total number of pixels corresponding to representative data discriminated by said discriminating unit as not inside the color reproduction range vs a number of all pixels in said input color image data;

a compression ratio deciding unit for deciding through a computing sequence previously set when the ratio obtained by said ratio computing unit exceeds a specified value;

a compression ratio setting unit for a user to set a compression ratio; and a linear compression unit for executing linear compression, when a compression ratio is set by said compression ratio setting unit, to said input color image data using the compression ratio and also executing linear compression to said input color image data in other cases according to a compression ratio decided by said compression ratio deciding unit.

12. An image processing apparatus according to claim 11, wherein said compression ratio deciding unit computes a compression ratio for each said region.

13. An image processing apparatus comprising:

a color corrector for executing color correction for correcting input color image data using parameters so that the input color image data will be within a color reproduction range of a color image output device;

an image data representing unit for dividing a homogeneous color space into a plurality of regions and having said input color image data present in each region represented by one representative data;

a pixel number counting unit for counting a number of pixels in said input color image data present in a region for each region;

a discriminating unit for making a determination as to whether said representative data is within a color reproduction range of said color image output device;

a ratio computing unit for computing a ratio of the total number of pixels corresponding to representative data discriminated by said discriminating unit as not inside the color reproduction range vs a number of all pixels in said input color image data;

a compression ratio deciding unit for deciding through a computing sequence previously set when the ratio obtained by said ratio computing unit exceeds a specified value;

a compression ratio setting unit for a user to set a compression ratio;

a linear compression unit for executing linear compression, when a compression ratio is set by said compression ratio setting unit, to said input color image data using the compression ratio and also executing linear compression to said input color image data in other cases according to a compression ratio decided by said compression ratio deciding unit, an operating unit for selecting a color in said input color image data; and a parameter computing unit for computing parameters according to the color selected by said operating unit.

14. An image processing apparatus according to claim 13, wherein said compression ratio deciding unit computes a compression ratio for each said region.

15. An image processing apparatus according to claim 13, wherein said operating unit selects a color of the central portion of an input image comprising input color image data.

16. An image processing apparatus according to claim 13, wherein said operating unit selects a color of a portion having the maximum area in an input image comprising input color image data.

17. An image processing apparatus comprising:

a virtual device for receiving input color image data, for executing processing in a direction reverse to that in a color image output device, and for outputting output color image data based on said input color image data, said output color image data being in the color space of color image data input into said output color device, said color space having a plurality of dimensions;

a discrimination unit for making a determination as to whether said input color image data is within a color reproduction range according to individual comparisons of values of said output color image data from said virtual device in each of said dimensions in the color space and respective ranges in the color space of the color image output device;

a color corrector for correcting the input color image data to be within the color reproduction range of the color image output device according to said determination that the input color image data is within the color reproduction range of the color image output device; and a measuring unit for measuring historical changes of or environmental change for said color image output device.

18. An image processing apparatus according to claim 17, wherein said virtual device selects optimal parameters from a plurality of parameters previously set taking into considerations historical changes of or environmental changes for said color image output device according a result of measurement by said measuring unit, and executes said processing in the reverse direction.

19. An image processing apparatus comprising:

a virtual device for receiving input color image data, for executing processing in a direction reverse to that in a color image output device, and for outputting output color image data based on said input color image data, said output color image data being in the color space of color image data input into said output color device, said color space having a plurality of dimensions;

a discrimination unit for making a determination as to whether said input color image data is within a color reproduction range according to individual comparisons of values of said output color image data from said virtual device in each of said dimensions in the color space and respective ranges in the color space of the color image output device;

a measuring unit for measuring historical changes of or environmental change for said color image output device;

an operating unit for selecting a color in said input color image data;

a parameter computing unit for computing parameters according to a color selected by said operation unit; and a color corrector for correcting the input color image data using said parameters to be within the color reproduction range of the color image output device according to said determination that the input color image data is within the color reproduction range of the color image output device.

20. An image processing apparatus according to claim 19, wherein said virtual device selects optimal parameters from a plurality of parameters previously set taking into considerations historical changes of or environmental changes for said color image output device according a result of measurement by said measuring unit, and executes said processing in the reverse direction.

21. An image processing apparatus according to claim 19, wherein said operating unit selects a color of the central portion of an input image comprising input color image data.

22. An image processing apparatus according to claim 19, wherein said operating unit selects a color of a portion having the maximum area in an input image comprising input color image data.

23. An image processing apparatus comprising:
- a virtual device for receiving input color image data, for executing processing in a direction reverse to that in a color image output device, and for outputting output color image data based on said input color image data, said output color image data being in the color space of color image data input into said output color device, said color space having a plurality of dimensions;
- a discrimination unit for making a determination as to whether said input color image data is within a color reproduction range according to individual comparisons of values of corrected output color image data from said virtual device in each of said dimensions in the color space and respective ranges in the color space of the color image output device;
- a color corrector for correcting the input color image data to be within the color reproduction range of the color image output device according to said determination that the input color image data is within the color reproduction range of the color image output device;
- a measuring unit for measuring historical changes of or environmental change for said color image output device; and
- a correcting unit for correcting said output color image data obtained through said processing in the reverse direction as said corrected output color image data according to a result of measurement by said measuring unit.

24. An image processing apparatus comprising:
- a virtual device for receiving input color image data, for executing processing in a direction reverse to that in a color image output device, and for outputting output color image data based on said input color image data, said output color image data being in the color space of color image data input into said output color device, said color space having a plurality of dimensions;
- a discrimination unit for making a determination as to whether said input color image data is within a color reproduction range according to individual comparisons of values of said corrected output color image data from said virtual device in each of said dimensions in the color space and respective ranges in the color space of the color image output device;
- a measuring unit for measuring historical changes of or environmental change for said color image output device;
- a correcting unit for correcting said output color image data obtained through said processing in the reverse direction as said corrected output color image data according to a result of measurement by said measuring unit;
- an operating unit for selecting a color in said input color image data;
- a parameter computing unit for computing parameters according to a color selected by said operation unit; and
- a color corrector for correcting the input color image data using said parameters to be within the color reproduction range of the color image output device according to said determination that the input color image data is within the color reproduction range of the color image output device.

25. An image processing apparatus according to claim 24, wherein said operating unit selects a color of the central portion in an input image comprising input color image data.

26. An image processing apparatus according to claim 24, wherein said operating unit selects a color of a portion having the maximum area in an input image comprising input color image data.

* * * * *